P. W. MURPHY.
WEAR TAKE-UP FOR SLIDES.
APPLICATION FILED FEB. 20, 1919.
1,344,592.
Patented June 22, 1920.
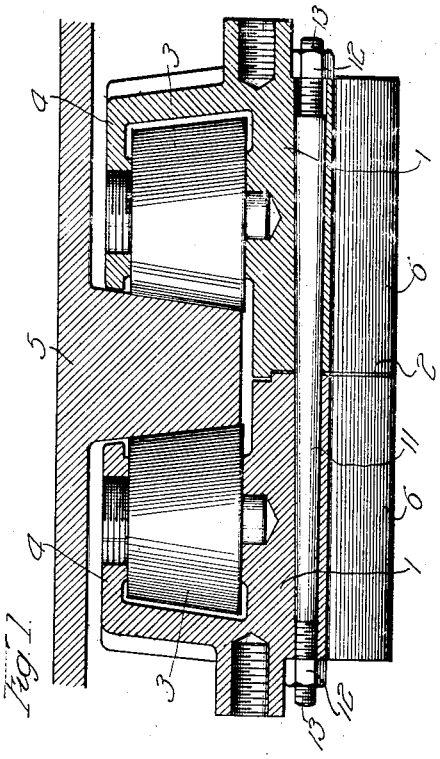
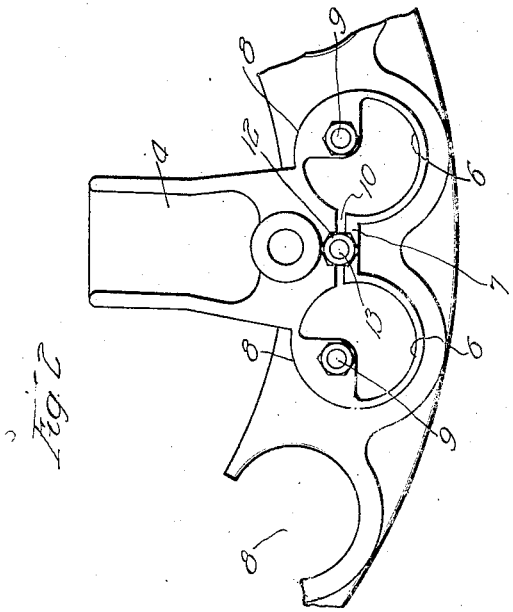
Witnesses
Arthur W. Carlson
Robert H. Weir
Inventor
Peter W. Murphy
by Jabel & Mueller
Attys

UNITED STATES PATENT OFFICE.

PETER W. MURPHY, OF CHICAGO, ILLINOIS, ASSIGNOR TO MURPHY ENGINEERING COMPANY, OF CHICAGO, ILLINOIS, A CORPORATION OF MICHIGAN.

WEAR-TAKE-UP FOR SLIDES.

1,344,592.  Specification of Letters Patent.  Patented June 22, 1920.

Application filed February 20, 1919. Serial No. 278,261.

*To all whom it may concern:*

Be it known that I, PETER W. MURPHY, a citizen of the United States, residing at Chicago, in the county of Cook and State of Illinois, have invented a certain new and useful Improvement in Wear-Take-Ups for Slides, of which the following is a full, clear, concise, and exact description, reference being had to the accompanying drawings, forming a part of this specification.

My invention relates to cam slides and has to do more particularly with adjustable cam slides, an object being to provide a device of this character for use more particularly in connection with motors in which there is a translation of reciprocable lineal movement to rotary movement by means of pistons acting upon a reciprocating slide carrying rollers which act upon a peripheral flange upon a cam so as to effect a rotation thereof. In machines of this character there is, of course, wear upon the slides and guideways in which they run and it is important to maintain these parts so that they operate without any side play. Therefore, I have provided a slide which has a wear take-up so constructed as to cause preferably an equal adjustment along the entire length of the slide.

For a better understanding of my invention reference is to be had to the accompanying drawing in which—

Figure 1 is a longitudinal section of a cam slide and part of a cam; and

Fig. 2 is an end elevation showing the slide carried in the guideway.

Referring now more in detail to the preferred form of my invention it comprises a slide consisting preferably of two end portions 1, 1 having one or more shims 2 of the proper thickness between the abutting ends of the portions, 1, 1 for adjustment purposes as will be hereinafter more particularly pointed out. Bolts 9 hold the portions in alinement and against the shims 2. The end portions 1, 1 support a pair of cam rollers 3 rotatable upon a shaft screwed in from the overhanging arm 4. These cam rollers 3 ride upon a peripheral flange carried by the drum 5, this flange being so shaped that when the cam slide is lineally reciprocated the cam drum 5 is rotated. This slide 1 is carried in a guideway 8 and comprises a pair of parallelly disposed sections 6 preferably tubular and connected by a central rib 7 longitudinally split at 10. A taper-pin 13 extends through the two sections 1, 1 resting in the taper-seat 11 and carrying adjustable nuts 12. Thus, if the slide becomes loose from wear the nut 12 at the large end of the pin 13 is loosened and the nut 12 at the small end turned so as to draw the stud 13 through the tapered bored seat and expanding the tubular portions 6 throughout their length until the wear has been taken up, at which time the nuts 12 are tightened to hold the parts in adjustment.

Now in order to take up wear between the rollers 3 and cam 5, shims 2 of the proper thickness may be placed between the sections 1, 1, and if necessary the seat 11 may be re-broached in order to properly take the expanding stud 13.

It will thus be apparent that a slide is produced which is readily expanded evenly throughout substantially the entire length thereof so as to take up the wear resulting from the reciprocation thereof.

For the purpose of illustrating my invention I have shown it in a particular way and described it with a particular kind of machine, but I contemplate using it in other ways than that shown and described and therefore do not desire to be limited to this exact device but aim to cover all that which comes within the spirit and scope of the appended claims.

What I claim as new and desire to secure by Letters Patent is:

1. A cam slide comprising a pair of cylindrical hollow bodies secured in spaced relation by a longitudinal split rib, means for uniformly expanding the rib throughout its length, together with the adjacent portions of the bodies and cam engaging means on the bodies.

2. A cam slide comprising a pair of cylindrical hollow bodies secured in spaced parallel relation by a longitudinally split rib, a taper pin extending longitudinally of the rib within the slot thereof for uniformly expanding the rib and adjacent portions of the bodies and cam engaging means on the bodies.

3. A cam slide comprising a pair of oppositely disposed sections secured in longitudinal alinement by a pair of holding members extending therethrough, the sections having corresponding cylindrical hollow bodies secured in spaced parallel relation by a longitudinally split rib, means for uniformly expanding the rib and adjacent portions of the bodies, and cam engaging means on the bodies.

4. A cam slide comprising a pair of oppositely disposed sections secured in longitudinal alinement by a pair of holding members extending therethrough, the sections having two corresponding cylindrical hollow bodies secured in spaced parallel relation by a longitudinally split rib, the rib having a tapered pin seat extending longitudinally through the slotted portions, a tapered pin engaging in the seat or spreading the rib, adjusting nuts for determining the position of the pin, and cam engaging means on the bodies.

5. The combination of a guide having partially cylindrical guideways disposed in pairs with a cam slide comprising a pair of cylindrical hollow bodies secured in spaced parallel relation by a longitudinally split rib and adapted to engage in a pair of the guideways, means for uniformly expanding the rib and adjacent portions of the bodies, and cam engaging means on the bodies.

6. A cam slide comprising a hollow cylindrical member with yielding walls, and means to expand said walls to take up any wear in the guideway for the slide.

7. A cam slide comprising a pair of hollow cylindrical members with yielding walls, said members being arranged side by side, and means to expand said walls to take up any wear in the guideways for the slides.

8. A cam slide comprising a pair of hollow cylindrical members with yielding walls, said members being arranged side by side, and a single means to expand said walls to take up any wear in the guideways for the slides.

9. A cam slide having a pair of end portions, shims positioned between the adjoining ends of the portions, and means to adjust said portions toward each other as the shims are removed.

10. A cam slide having a pair of end portions, a roller on each portion, shims between the adjoining ends of the portions, and means for adjusting said portions toward each other as the shims are removed to thereby decrease the distance between the rollers.

11. A cam slide comprising two parallelly disposed members having their hollow interiors separated by a split rib having a tapered opening extending longitudinally therethrough, and a tapered pin adjustable through said opening to expand said members.

12. A cam slide comprising end portions spaced apart by shims, tubular members on each portion alining with corresponding tubular members on the other portion, means to adjust said portions toward each other as the shims are removed, and means for expanding said tubular members.

In witness whereof I hereunto subscribe my name this 31st day of January A. D. 1919.

PETER W. MURPHY.